(12) United States Patent  
Dierickx

(10) Patent No.: US 8,895,120 B2  
(45) Date of Patent: Nov. 25, 2014

(54) PLASTIC PREFORM AND PROCESS FOR THE MANUFACTURING THEREOF TO A POLYCHROMATIC CONTAINER

(75) Inventor: William Dierickx, Destelbergen (BE)

(73) Assignee: Resilux, Wetteren (BE)

( * ) Notice: Subject to any disclaimer, the term of this patent is extended or adjusted under 35 U.S.C. 154(b) by 824 days.

(21) Appl. No.: 12/735,734

(22) PCT Filed: Feb. 12, 2009

(86) PCT No.: PCT/BE2009/000008  
§ 371 (c)(1),  
(2), (4) Date: Aug. 12, 2010

(87) PCT Pub. No.: WO2009/100506  
PCT Pub. Date: Aug. 20, 2009

(65) Prior Publication Data  
US 2010/0307633 A1 Dec. 9, 2010

(30) Foreign Application Priority Data  
Feb. 12, 2008 (BE) .................................. 2008/0082

(51) Int. Cl.  
*B32B 1/02* (2006.01)  
*B29C 39/12* (2006.01)  
(Continued)

(52) U.S. Cl.  
CPC ..... *B29C 49/221* (2013.01); *B29B 2911/14026* (2013.01); *B29K 2995/0021* (2013.01);  
(Continued)

(58) Field of Classification Search  
USPC ................... 428/34.1, 34.4–34.7, 35.7–35.9, 428/36.4–36.92, 542.8; 264/245, 255, 264/328.18, 537  
See application file for complete search history.

(56) References Cited

U.S. PATENT DOCUMENTS

| | | | |
|---|---|---|---|
| 5,028,226 A | 7/1991 | De'ath et al. | |
| 5,595,799 A | 1/1997 | Beck | |

(Continued)

FOREIGN PATENT DOCUMENTS

| | | |
|---|---|---|
| DE | 4330451 | 3/1995 |
| EP | 0376469 A | 7/1990 |

(Continued)

*Primary Examiner* — Walter B Aughenbaugh  
(74) *Attorney, Agent, or Firm* — James Creighton Wray

(57) ABSTRACT

Preform for the blow moulding of a container comprising a neck section (1) including a pouring opening (20), an adjacent wall section (2) and a bottom section (3). It consists of a primary plastic raw material in a primary area ($A_1$, $A_2$, $A_3$) and at least one secondary material in at least a secondary area ($B_1$, $B_2$, $B_3$) both having a mutually different coloration. Said preform is remarkable in that said bottom section (3) is composed of a multi-layer structure with primary layers composed of said primary plastic material, and additional secondary layers (6, 7, 8, 9, 10). The latter are composed of said secondary material, two surface secondary layers the one of which (6) is directed outwardly respective the preform, whereas the other one (10) is directed inwardly, and an intermediate secondary layer between them (7, 8, 9), which constitutes a core layer, which is located between two said primary layers. Said preform is in one single piece, the transition ($Z_1$, $Z_2$) from said primary to said secondary material being seamless and uninterrupted. The invention further relates to a manufacturing method of said preform.

26 Claims, 7 Drawing Sheets

(51) Int. Cl.
  *B29C 45/00* (2006.01)
  *B28B 7/22* (2006.01)
  *B29C 49/22* (2006.01)
  *B65D 1/02* (2006.01)
  *B29B 11/14* (2006.01)
  *B29C 45/16* (2006.01)
  *B29C 49/00* (2006.01)
  *B29K 105/00* (2006.01)
  *B29K 67/00* (2006.01)
  *B29L 31/00* (2006.01)
  *B29C 49/06* (2006.01)

(52) U.S. Cl.
  CPC  *B29K 2105/253* (2013.01); *B29B 2911/14413* (2013.01); *B65D 2203/00* (2013.01); *B29B 2911/1414* (2013.01); B65D 1/0261 (2013.01); *B29B 2911/14466* (2013.01); *B29K 2105/258* (2013.01); *B32B 1/02* (2013.01); B65D 1/0215 (2013.01); *B29K 2067/00* (2013.01); B29B 11/14 (2013.01); *B29B 2911/14093* (2013.01); *B29K 2105/0032* (2013.01); *B29B 2911/14326* (2013.01); *B29B 2911/14126* (2013.01); *B29B 2911/14033* (2013.01); *B29B 2911/1444* (2013.01); *B29B 2911/14086* (2013.01); B29C 45/1684 (2013.01); *B29L 2031/7158* (2013.01); *B29B 2911/14113* (2013.01); *B29B 2911/1402* (2013.01); B29C 49/0073 (2013.01); *B29B 2911/1412* (2013.01); *B29K 2995/0025* (2013.01); *B29K 2995/0069* (2013.01); *B29B 2911/14153* (2013.01); B29C 2049/222 (2013.01); B29C 45/1646 (2013.01); *B29C 49/06* (2013.01); *B29B 2911/14146* (2013.01)
  USPC ....... 428/35.7; 428/34.7; 428/35.9; 428/36.4; 428/36.6; 428/36.7; 428/542.8; 264/245; 264/255; 264/328.18; 264/537

(56) References Cited

U.S. PATENT DOCUMENTS

| | | |
|---|---|---|
| 2002/0058114 A1 | 5/2002 | Sung |
| 2005/0191451 A1 | 9/2005 | Osika et al. |
| 2005/0252879 A1 | 11/2005 | Pedmo et al. |

FOREIGN PATENT DOCUMENTS

| | | |
|---|---|---|
| EP | 0380215 A2 | 8/1990 |
| EP | 0367123 | 5/1991 |
| EP | 0835813 | 4/1998 |
| EP | 1332861 | 8/2003 |
| EP | 1559530 | 8/2005 |
| EP | 1876009 A | 1/2008 |
| JP | 61219644 A | 9/1986 |
| JP | 2067117 | 3/1990 |
| JP | 3076624 | 4/1991 |
| WO | 9721539 | 6/1997 |
| WO | 9732708 A1 | 12/1997 |
| WO | 0238673 A2 | 5/2002 |
| WO | 2006012713 | 2/2006 |

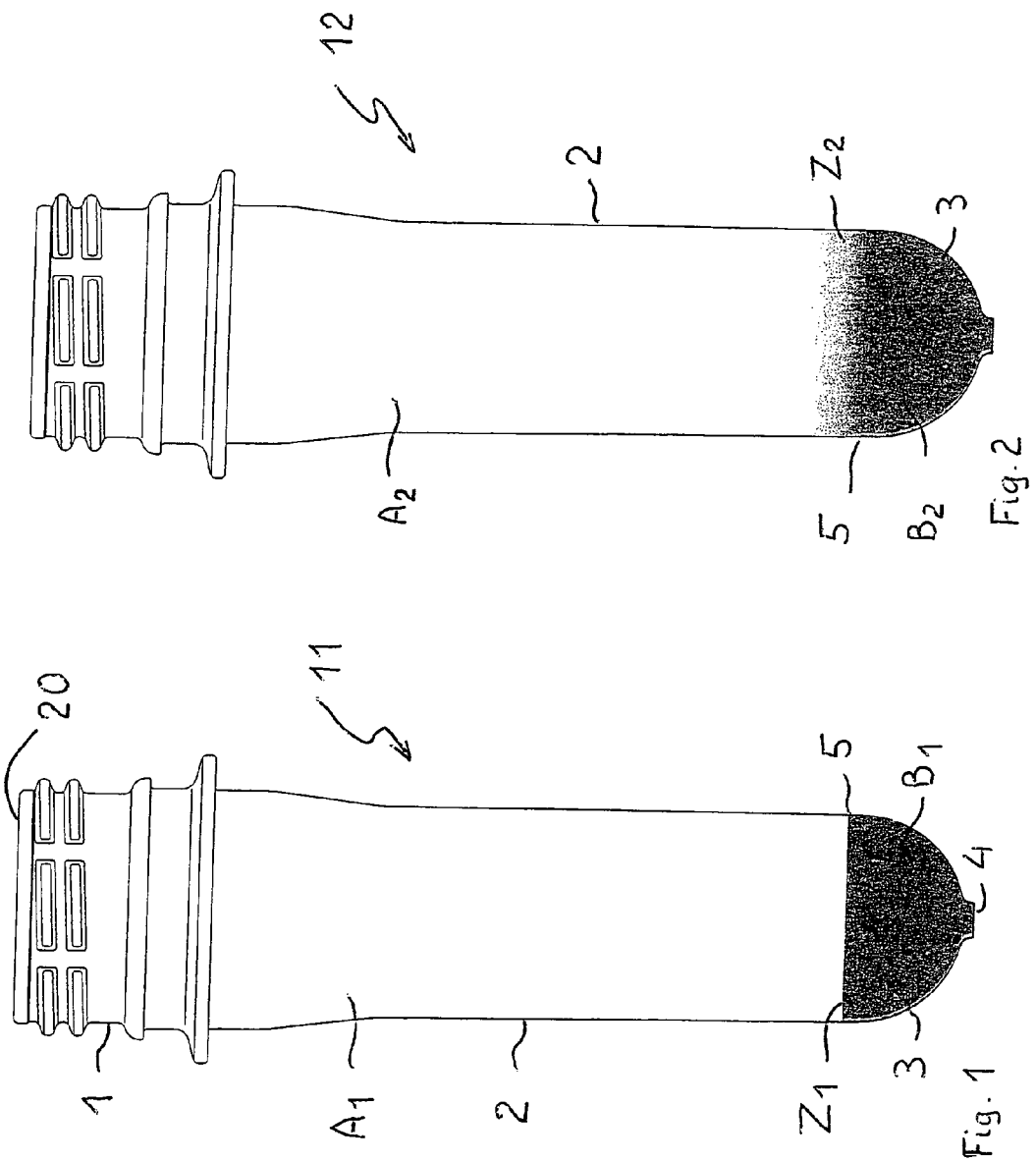

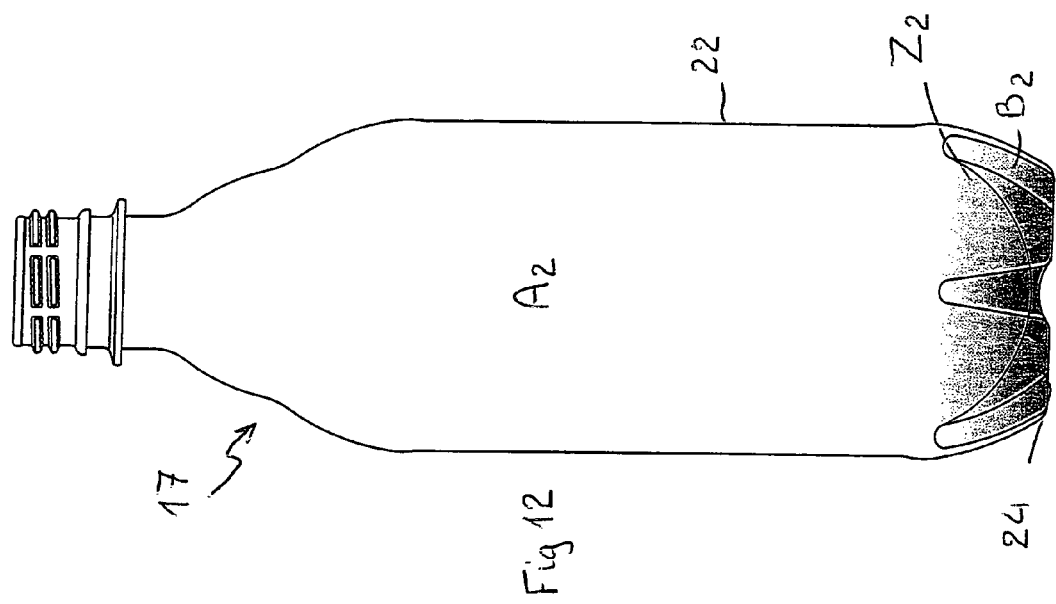
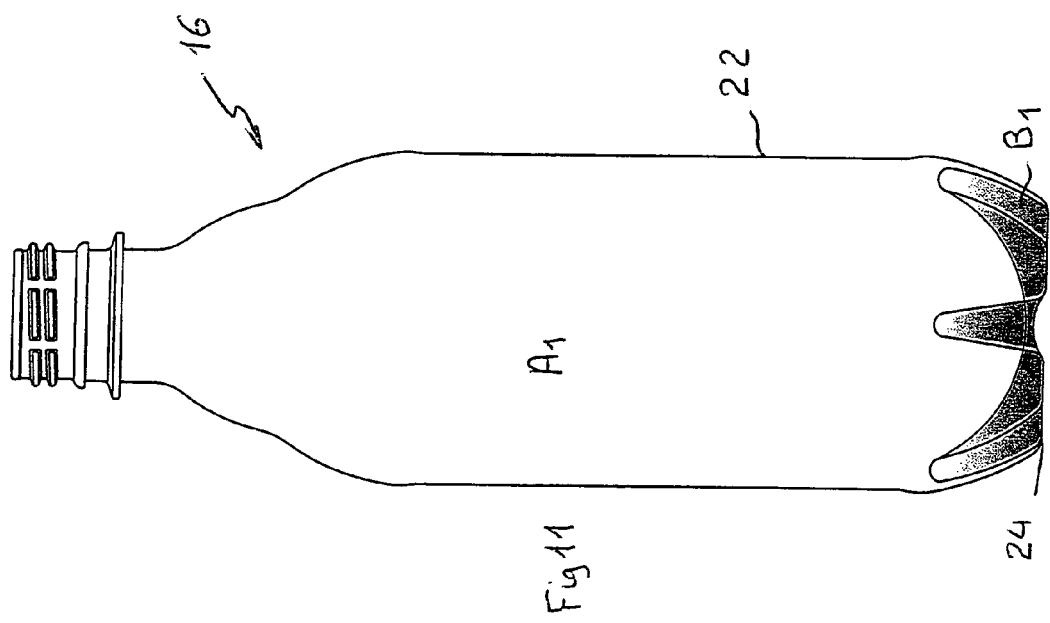

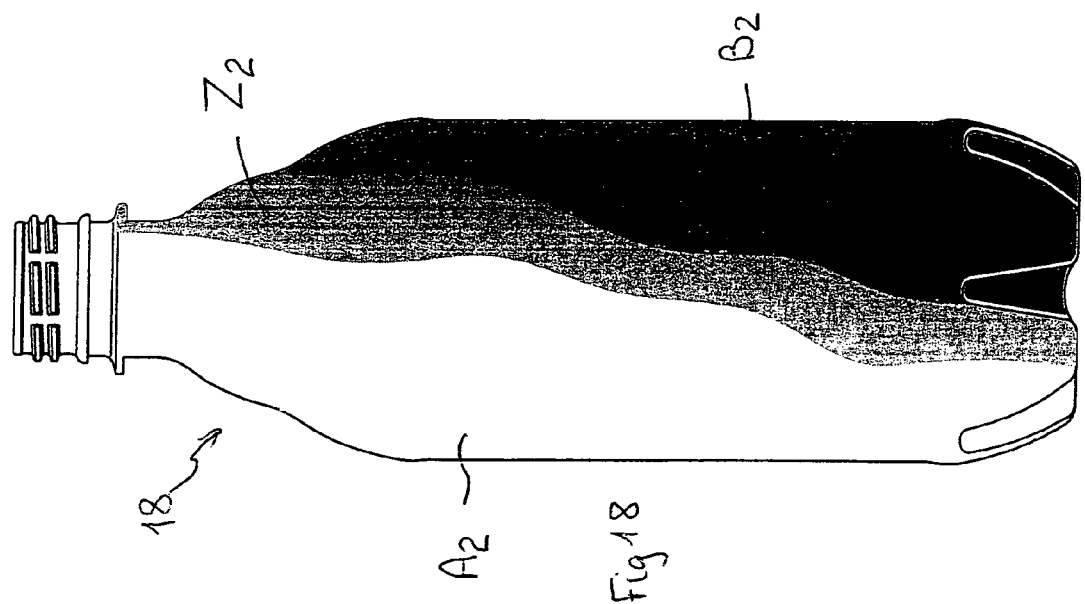
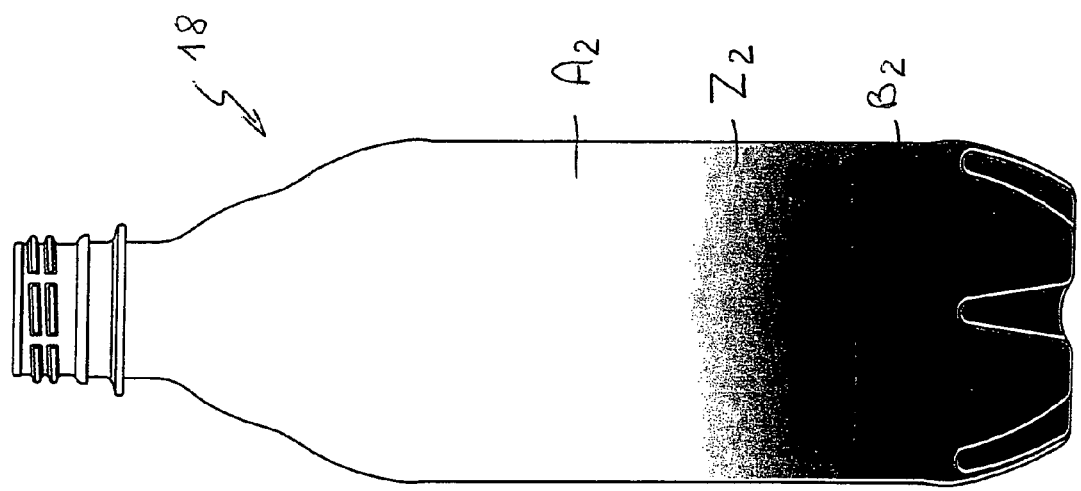

PLASTIC PREFORM AND PROCESS FOR THE MANUFACTURING THEREOF TO A POLYCHROMATIC CONTAINER

This application claims the benefit of Belgian Application No. 2008/0082 filed Feb. 12, 2008 and PCT/BE2009/000008 filed on Feb. 12, 2009, which are hereby incorporated by reference in their entirety as if fully set forth herein.

FIELD OF THE INVENTION

The present invention relates to a preform to be blow moulded into a container intended for packaging products, in particular liquid and/or edible, such as beverages, which consist of a body section, an adapted neck section enclosing a pouring spout, and a bottom section at the opposite end thereof.

BACKGROUND OF THE INVENTION

The emergence of ever growing marketing requirements and related identification needs created an increasing need for a colour parameter to be introduced in bottle packaging. This created therefore the need to provide for the possibility of producing corresponding preforms as semi-finished products for the manufacture of bottles and other containers.

A process for producing containers with two colours of different materials is known from document EP 1 559 530 A1, wherein a primary and a secondary material are injected through different injection points for both materials. This has the disadvantage that the secondary material is applied on top of the primary material, thereby generating bonding joints in the contact areas between preform subsections made of primary and secondary materials. This results in the absence of homogeneity between both materials, and also makes the process more complex. This further limits the placement options for the secondary material to precisely delimitated areas without the secondary material being diffused in the primary raw material. The second material used here is usually the same material as the base material but with a different colour, enabling the formation of a preform, resp. bottle with two different colours, but with the following restrictions. There are two separate and successive injection steps needed, whereby the colouring is made in a discrete manner, particularly in specific places and discontinuous. The method used here deposits a secondary plastic material in a pre-determined area that was a space remained empty in the original primary preform, which is a relatively weak point within the structure. It is therefore also impossible to bring an additional three-dimensional layer on top of the external wall of the preform, involving a restriction on the number of colours.

Besides, document US 2005/0252879 discloses a process for producing opaque containers with a transparent strip extending from top to bottom of the container, through which a protection from environmental light is achieved together with a possible visualization of the content. For the sake of protection, the visualization window is reduced to a limited strip, the functional width whereof should be limited to a minimum. This is a strong restriction in terms of shape, dimension and location on the container imposed by the function itself. Such a sight window is merely intended to serve as a level indicator for the food contained in the container.

Document EP 0 835 813 A1 discloses a method for producing a preform with a vertical strip in a different colour, wherein the connection line is in a recess, in order to get a straight appearance.

Document JP 03 076624 shows a similar solution, but with a co-injection, so that the transparent strip is continuous with the rest of the bottle. However, the continuity consists in a joint that is limited to the width of the container. This has the drawback to remain fragile.

Document US 2002/0058114 discloses a still further preform with multiple colours yet requiring several successive injection operations. The primary plastic material is poured into a first mould intended for the preform having its final shape in the neck region and has a very thin wall at the lower bottom part of the preform. The resulting provisional preform is then kept around the core, and said first mould is replaced by a second mould corresponding to the final form of the preform on a part that is located directly under said first area, thereby having again a very thin wall at the lower part of the preform. Subsequently, a second injection operation is proceeded. This process is further set forth analogously for a possible third or even fourth colour. The material that is visible in the lower part is thus injected around all the aforementioned thin layers. This technology is focused on injection over-moulding. A basic preform is manufactured here in one colour, after which it is transformed in a second matrix with a second colour and even still further in a third mould for a third colour, etc. . . . This method has the disadvantage that at least two steps or even three or four processing steps have to be implemented, and resp. two, three or four matrixes have to be used for each cavity. In addition, the colours can only be located in this process through the matrixes. This has further disadvantage to provide virtually no flexibility and to be also much more expensive in conception and production than with co-injection. Finally, it again offers no continuity between the different materials injected.

Document EP 1 332 861 A1 discloses a method for producing a preform with an intermediate layer being made of a recycled material. The invention discloses the solution to obtain a thinner intermediate layer in the bottom section than in the wall section, in order not to weaken the bottom section due to the use of recycled material. Neither colouring nor identification possibility is suggested here.

Document DE 43 30 451 A1 discloses a method for producing a continuous preform with two different materials, intended for implementing a high temperature resistant material for the neck section, and a cheap blow mouldable material for the wall section. Different colours allow quality control or bottle identification. But here again, the continuity consists in a joint limited to the width of the container, which remains fragile.

From WO 97/21539, there is also a known process for the manufacture of preforms or containers with various colours, which is to inject the different coloured materials sequentially and immediately one after another. The primary transparent or light coloured plastic material is injected, with a quantity determined in order to form a first part in the neck region. The dark or otherwise coloured secondary material is injected immediately after and is dosed in such a way that it fills the rest of the preform. The primary material is then injected into the pipes in order to push away the secondary material from the pipes, and at the same time to prepare for the moulding of the following preform. This approach can be applied for more than two colours. Yet in this case with two different materials, the second and third injection operation can be carried out simultaneously through a concentric valve system. As the wall of the mould and the core are relatively cold during the injection operation, a deposition of the primary material on both surfaces is obtained in the lower part of the form. The secondary material then arrives between these two deposits, with a thickness resulting in the higher part of the form which is smaller than that of the primary material. Owing to the viscosity and the pouring temperatures of both materials, a thickness can be obtained after blowing into a container which is such that the darker colour in the preform shows a more clear aspect in the container. Even a single material can be injected with selected colour pigments added directly to the injection point during a chosen part of the injection operation, thereby obtaining the desired colour at a chosen height of the preform. However, containers produced through this method have a boundary between two colours with an irregular shape, evolving as a zigzag course.

Finally, from document U.S. Pat. No. 5,595,799 a process is known for producing a preform with co-injection, involving two different coloured PET materials. Preforms with various colours at different places are obtained. The main embodiments proposed consist in preforms having dark-coloured lower half and a light or slightly coloured top half, or vice versa, or even a succession of dark/light/dark coloured preforms, respectively. This yet provides some possibilities of identification but remains limited to a single layer, and to fixed and clear areas for each colour along the wall section. The more so, the continuity consists in a joint limited to the width of the container. This remains fragile. This document yet discloses a co-injection process with two colours but remains in default to a unanimous distributed colouring over the preform and its bottle. On the contrary, the blown bottles even show very large colour variations along a horizontal plane with a wavy zigzag course between the colours, with no neat straight dividing line between the colours. Moreover, only a single colour is present at the injection point for the bottle. Again only the production of a single layer is shown in this document. Furthermore, the above process is only addressed without special colour effects mentioned, nor possibilities for adjustments, especially for the bottles.

It thus appears from the preceding that none of the above known containers or manufacturing methods is satisfactory as such.

AIM OF THE INVENTION

This invention aims to remedy to at least one of the aforementioned shortcomings by providing a satisfactory solution. This invention therefore proposes a container with a particular colour effect, in particular special diffusion effects of one or several colours in the container, wherein the localization of colourings has neither functional limitations nor seam lines or any other structural heterogeneity, but on the contrary with a high quality continuity.

A further object of this invention is to provide a preform for a container of the type above that can be obtained in a relatively simple and cheap way.

SUMMARY OF THE INVENTION

This problem is solved with a preform for the blow moulding of a container comprising a neck section including a pouring spout, an adjacent wall section and a bottom section opposite to the neck section and intended to form the supporting base of the produced container, wherein the preform consists of a primary plastic raw material disposed in a primary area and at least one secondary material disposed in at least a secondary area, said primary and secondary materials presenting a mutually different coloration and the transition from said primary to said secondary material being seamless, said preform consisting in one single piece. It is remarkable in that at least a substantial part of said bottom section is composed of a multi-layer structure with primary layers composed of said primary plastic material, and additional secondary layers which are composed of the said at least one secondary material, two surface secondary layers the one of which is directed outwardly respective the preform the other one is directed inwardly, and an intermediate secondary layer between them, which constitutes a core layer, which is located between two said primary layers.

Thanks to this type of multilayer structure, the transition between the primary and secondary area is not only continuous in that both materials solidify at the same time, but said transition extends along said layers. A welding joint is thus produced that is significantly longer than the welding joints obtained in the solutions proposed in the prior art. Said joints, while also continuous in that both materials solidified at the same time and in contact, extend only substantially along the thickness of the preform—and later on of the container—which constitutes joints of some tenths of a millimeter at best. With the present invention said welding joints extend over several millimeters, or even over several centimeters. Whereas in known preforms, resp. containers joints are visible on the surface thereof as seams, in the present invention any joint is only internal as a part of the inner structure thereof, so that it remains invisible.

According to a preferred embodiment of the invention, at least one of the subareas is opaque, and/or possibly translucent, but not transparent, wherein at least said opaque resp. translucent area is coloured.

According to a more preferred embodiment of the invention, said secondary opaque, resp. translucent area is limited to the bottom section of the preform.

According to a further preferred embodiment of the invention, at least said primary area is transparent and/or not coloured. The diffusion effect achieved in a container blow moulded from such a preform is quite amazing.

According to another embodiment of the invention, said opaque subareas at least partially flow in each other. Said areas may have a mutually strongly contrasted coloration.

According to a preferred embodiment of the invention, the transition between some areas consists in a separation line.

According to a more preferred embodiment of the invention, said areas are separated by a transition area having a significantly weaker contrast when compared to said areas. Besides, said transition area may advantageously have a substantially constant width. This overlapping area generates an extended chromatic effect showing three components built up from merely two working dyes. In addition, the coloration of said areas may be substantially uniform.

According to a further preferred embodiment of the invention, at least one of said additional layers is composed of a mixture of plastic as said secondary material with a colouring dye. Advantageously, said mixture includes the same dye for at least two of additional secondary layers. This further enhances the colour thus separately selected.

According to a particularly remarkable embodiment of the invention, said colour dyes consist in a fluorescent in at least one of the additional secondary layers. Said dyes may also consist in a phosphorescent, or even a luminescent dye, each generating particular colour effects.

According to a particular embodiment of the invention, at least one secondary material is the same as said primary plastic material.

According to an optimised embodiment of the invention, said additional inner, respectively outer layer substantially extends to the border of the bottom, which is located at the bending of the preform wall. This offers the best compromise between achieving the desired special colour effect yet achieved with a coloured bottom only on the one hand, and keeping normal formability conditions, on the other hand. Indeed, dying substances such as pigments may adversely affect formability in that biaxially stretching followed by blow moulding is countered with increasing pigment loading. A large amount of pigment is a drawback in injection moulding since this reduces the ease with which the preform can be processed in a stretching and blowing device that converts it into the final container. Stretching and blowing the preform into a bottle with the required properties is then made more difficult. By contrast, the preforms with less added pigments have a high strength in the molten state, so they are much easier to process in conventional stretching and blow-moulding machines. The direct result thereof is that containers with a much lower weight can be manufactured with reduced amounts of pigments.

According to still further embodiments of the invention, said additional inner, respectively outer layer extends well above the edge of the bottom determined by the wall bending. Its free top end may evolve in a substantially horizontal plane extending in parallel to said wall bending, i.e. perpendicularly to the preform axis •. Said core layer may extend from the bottom up to at least the same extent as said inner layer, resp. outer layer.

According to another preferred embodiment of the invention, said core layer extends from the bottom to a height above said inner layer, resp. outer layer by a certain distance δ. This enables the achievement of said transition area approximately over the distance δ, while keeping the dye loading at levels that remain sufficiently low not to jeopardize said formability. Said distance δ determines a zone where the core layer is present, and the two outer and inner secondary layers are not present. In that zone the aspect will neither be the one of the primary area, nor the one of the secondary area, but an intermediate aspect, forming a transition zone.

According to a specific embodiment of the invention, said core layer has a pronounced thickness. It may advantageously constitute half of the bottom thickness at least locally. This may usefully result in the option of achieving enhanced colour effects by adding dying material in the bottom area only, while possibly keeping same away from the preform wall, thereby preserving the original formability.

The present invention may be implemented with different types of preforms, such as in a more specific embodiment thereof, in which the wall section of the preform has a multi-layer structure, in particular a three-layer structure consisting of a base wall layer in which an intermediate wall layer is included, which is composed of a tertiary plastic material, thereby acting as a barrier layer such as a gas barrier. Preferably, said barrier layer is the continuation of said core layer, more preferably extending up to the neck section.

The present invention also provides a preform for a container intended for containing products therein that are sensitive to radiation, in particular light sensitive food and dairy products, which is particular in that said preform is opaque over virtually the whole extent thereof, wherein a relatively low percentage of plastic additives is incorporated to generate said opaque appearance, so as to protect the inner space thereof which is delimitated by it against external radiation particularly electromagnetic radiation, more particularly light, thereby resulting in a so-called light barrier.

According to another advantageous embodiment of the invention, at least one of said materials comprises a certain amount of additives which have a neutralizing action on reagents with an adverse effect on the product to be contained in the container, wherein an active resp. passive barrier is formed in the wall of the preform. Said additives may consist in PET additives.

According to a particular embodiment of the invention, said primary plastic material consists in PET, whereas said tertiary material may consist in recyclates, especially PET, and/or mixtures thereof with aforementioned additives.

According to another particular embodiment of the invention, at least one of said intermediate layers consists in a fluid, more particularly a liquid. It may further consist of so-called polymers bio-aggregate, which are composed by cells and/or cell products, which are worked in a polymer.

According to still another embodiment of the invention, the mid surface of said intermediate layer when is directed outwardly towards the outer surface of the preform referred to the mid surface of its wall section.

According to still another embodiment of the invention, the preform comprises a pouring spout, the neck being provided with an externally extending annular projection forming a pouring no-drip rib at said opening spout, said rib having a graded surface, which is extending outside the wall, the external profile of the neck being provided with at least one further annular projection that forms a second no-drip rib, whereby the first no-drip rib and said second no-drip rib form the edges of a ring-shaped recess. This promotes a regular and clean pouring, without leaving traces of the poured liquid on the container wall thanks to the cavity configuration and its capillarity effect.

The invention also proposes a container blow moulded from such a preform. Said container may have at least locally polychroïsm, which results in a particularly attractive presentation thereof.

The present invention further relates to the use of such a container which is highly remarkable in that it is filled with a light scattering medium, especially a liquid medium with high diffusion capacity, in particular water. Thanks to such operating conditions, the fairly limited colouring is scattered over virtually the entire container when it is filled, especially at the free medium level, in particular liquid level in the container, even though the overall coloration is reduced the bottom of the preform. Depending on the observation place or angle to the container partly filled with water, it looks as it were a coloured liquid.

When placing such a container in artificial light, especially UV radiation, a spectacular light diffusion effect is achieved.

Quite surprising visual effects may thus be generated according to the present invention, which opens huge possibilities for a smart identification of containers, especially for containers intended to contain transparent liquids, like water. The latter stunning effect to creates a unique atmosphere that may advantageously be exploited in trendy places to catch attention.

The present invention further relates to a method for the injection moulding of a preform intended to be blow moulded into a container with a neck section including a pouring spout, an adjacent wall section and a bottom section, which comprises the following steps: first injecting a secondary material, which solidifies on the cold surfaces of a mould in an outside layer and of a core in an inside layer in the bottom section of said preform, subsequently injecting a primary material, which flows to the wall section and the neck section constituting substantially the complete volume of said wall and neck sections and two layers in the bottom section, in contact with the secondary material already solidified, and finally injecting a secondary material, filling up the remaining volume in the bottom section, thereby constituting a core layer in said bottom section. The first injected secondary material thus solidifies on the cold surface of the bottom section of the mould and of the core respectively, forming said inner and outer layers. The temperature of said surfaces is set in order to get the right thickness and length of said layers. Injecting immediately thereafter a primary material brings said primary material in contact with said secondary material while the latter is not yet solidified. Thus the solidification of both materials occurs at the same time while they are in contact over the whole length of said inner and outer layer. This guarantees a high quality joint between both materials. Once the secondary material is again injected, the free surface of the primary material is still liquid, and the same type of joint solidification takes place, guaranteeing again a high quality joint between both materials. The primary material is thus solidly embedded in the secondary material, forming the main part of the preform bottom, in a way that allows subsequent stretch blow moulding of the preform into a container without specific risk of brakage between both materials.

In a preferred embodiment of the method according to the invention, the quantity of primary material is slightly reduced and the secondary material injected in the final step increased, so that the core layer extends further in the wall section than the two other secondary layers.

In another embodiment of the method according to the invention, a tertiary material is injected before the final stage of the primary material injection, so that said tertiary material constitutes a core layer in said wall section. It is thus possible with the present invention to produce a preform having a three layer structure in the wall section, the intermediate layer being injected before the final stage. The temperature of the mould and core have to be adapted so that the primary material solidifies along said mould and core over a controlled thickness, letting a space available for the tertiary material for forming said intermediate layer.

According to another embodiment of the invention, a predetermined quantity of a primary synthetic material is injected in a hollow mould space, and a predetermined quantity of secondary resp. tertiary material is injected in the injected primary synthetic material in said hollow mould space before the formation of a core, wherein a secondary resp. tertiary material is used which is different from said primary material, wherein the injection in said hollow mould space is a parallel injection together with a part of said primary material, and wherein when injecting in parallel in the region of the injection aperture of said hollow mould space said secondary resp. tertiary material is injected outwardly from said preform and said primary material is injected inwardly with respect hereto.

According to another embodiment of the invention, at least one of said materials injected incorporates living material and is produced by a method comprising the steps of selecting a polymer, a set of organisms from among cells, living organisms and/or cell products, and having aggregates formed by working said cells and/or cell products in said polymers resulting in the formation of a so-called polymer-bio aggregate, wherein work is carried out at the working temperature range taken from a selected temperature interval.

Further particularities and features of the invention are defined in the further subclaims.

Further details are set out in the description with some exemplary embodiments of the invention illustrated by means of the appended drawings, wherein the same reference numerals relate to the same or similar elements.

BRIEF DESCRIPTION OF THE DRAWINGS

FIGS. 1 and 2 are respective side views of a first and a second embodiment of a preform according to the invention.

FIGS. 11 and 12 are each a side view of a first, resp. second embodiment of a container according to the invention, especially produced from the preform proposed in FIG. 1, respectively 2.

FIGS. 17 and 18 are side views of said fifth, resp. an eighth embodiment of a container according to the invention.

DESCRIPTION

Figure 3:
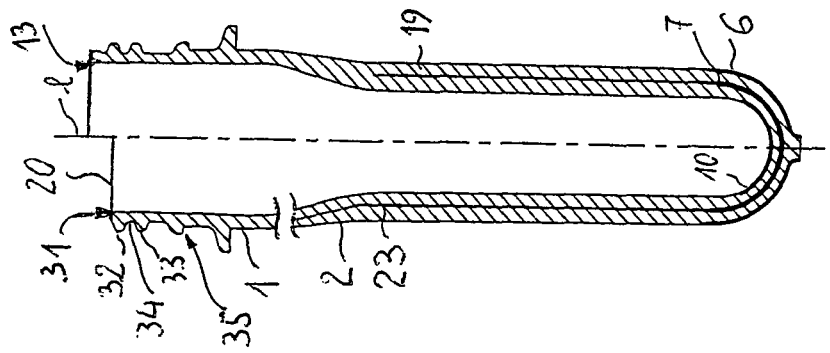
FIGS. 3 and 4 are diagrammatic representations of a mid cross section of said first, respectively second embodiments of a preform according to the invention shown in FIGS. 1 and 2.

This invention generally relates to preforms made from plastic material which consist of a neck section 1 including a pouring spout 20, a wall section 2 forming the actual body part of the preform which is intended to be blow moulded to a container, and a bottom part 3. The neck section 1 encompasses a pouring opening 20 on one side and evolves to said wall 2 in a neck ring 21 on the other side. In the bottom 3 there is provided an injection point 4 through which said plastic material is injected into a not represented injection-moulding matrix, to form the preform.

FIG. 1 shows a preform 11 extending along a longitudinal axis l and having a coloured bottom 3. In this embodiment, the transition between bottom 3 and wall 2 sections is clearly delimitated by a dividing line $Z_1$. This line is located at the bending area 5 where the bottom 3 evolves to the straight wall 2 of the preform. The bottom area 3 shows a colouring $B_1$, which is substantially uniform. In contrast, the remaining part $A_1$ of the preform 11 is uncoloured, in particular transparent.

FIG. 2 represents a variant of the preform 12 in which the transition area $Z_2$ between is coloured bottom section 3 and uncoloured wall 2 is progressive from an essentially coloured area 3 to the uncoloured area 2. This transition area $Z_2$ extends over a height, e.g. substantially the same as the height of the bottom area 3 to about half of it.

FIG. 3 shows the inner structure of the preform 11 shown in FIG. 1. In this case, both the neck 1 and the wall 2 present a monolayer structure, while the bottom 3 presents a multilayer structure.

Said monolayer structure is composed of a primary plastic material. In the bottom 3, at least one additional layer 6, 7, 10—three in the fig.—is included, which is made of secondary materials. These additional layers 6, 7, 10 may reach mutually different levels. In the example in FIG. 3, the inner layer 10 reaches a height less than both other additional layers 6 and 7, both extending at substantially the same height, approximately up to said bending 5.

These additional layers 6, 7, 10 are each coloured and contain dyes or pigments. By selecting the same colour therefore, the colour effect shown in FIG. 1 may be strengthened for the selected colour. The additional layers 6, 7 and 10 are achieved for example by mixing said colours with the primary plastic material.

Figure 4:
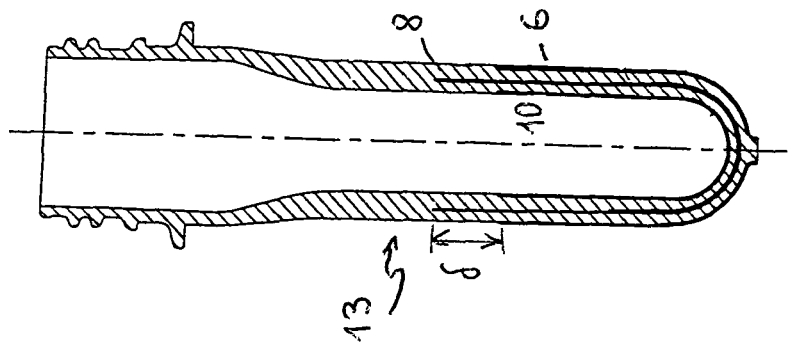

FIG. 4 shows the inner structure of the preform 12 shown in FIG. 2. In this variant, the size differences between the additional layers 6, 8, 10 are more pronounced, which generates said transition area $Z_2$. This is achieved by having the additional intermediate layer 8 extended over an additional distance δ in the wall 2 of the preform.

Figure 5:
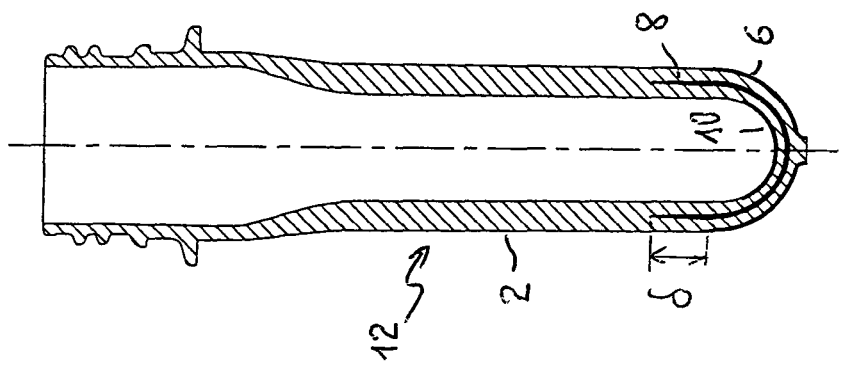
FIG. 5 is a diagrammatic representation of a mid cross section of a third embodiment of a preform according to the invention.

FIG. 5 shows the inner structure of another variant of the preform 13. The inner 6 and outer 8 layers extend significantly into the wall section, thus showing a preform with a secondary area over e.g. half of the height of said preform. The core layer 8 extends further than the inner and outer layers, but could also extend to the same height as said inner and outer layers.

Figure 9:
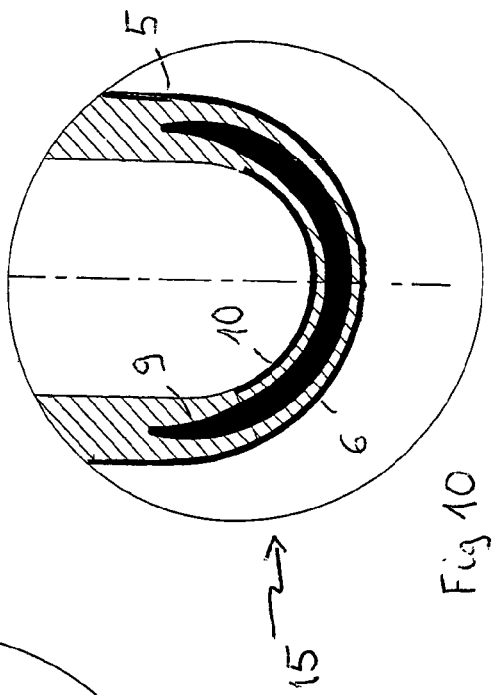
FIGS. 9 and 10 represent an analogue detailed view of the preform shown in FIG. 1, but according to a sixth and seventh embodiment of a preform according to the invention.
Figure 10:
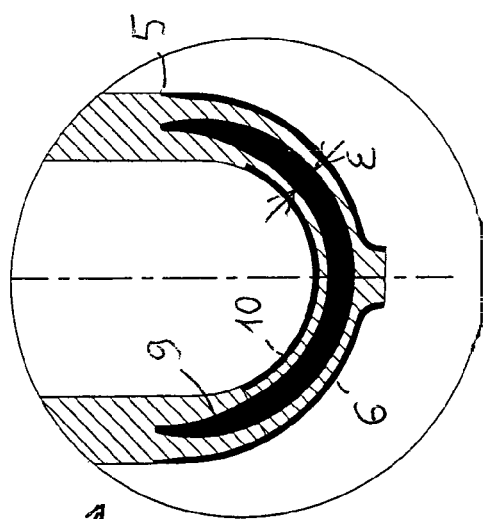
Figure 8:
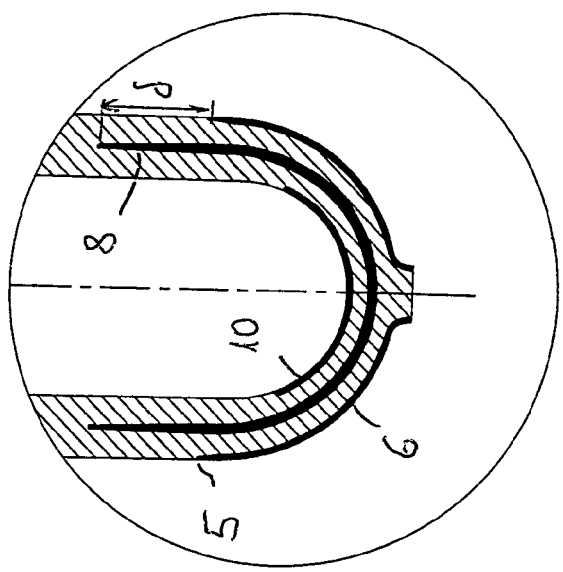
FIGS. 7 and 8 show an enlarged detailed view of a part of the preforms according to the invention represented in FIG. 3, respectively 4.
Figure 7:
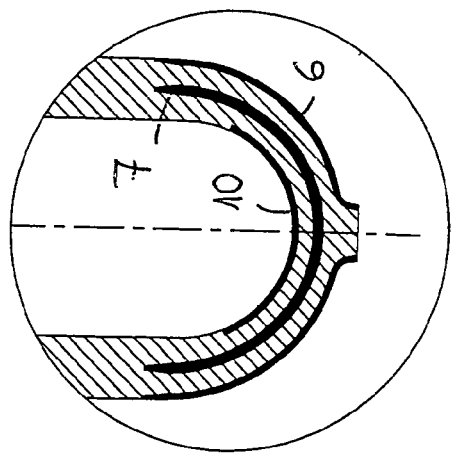

These size differences in the bottom section 3 are represented in an enlarged detail shown in FIGS. 7 and 8 respectively. FIGS. 9 and 10 show a detail of the bottom section of two further advantageous embodiments of a preform 14 and 15 in which the additional intermediate layer 9 presents a particularly pronounced thickness ϵ. Advantageously said thickness ϵ constitutes more than half of the total thickness of the bottom section. Furthermore, said additional intermediate layers 7, 8, 9 present a profile extending continuously along the injection point 4 without interruption. The preforms proposed above thus all show a multi-layer structure of their bottom section 3 ranging up to five layers therein.

In all above embodiments set out above, the weld joint width is significantly higher than the wall thickness of the preform, resp. of the container. This specific feature of the invention gives a significantly higher strength to said weld joint, and guarantees its strength during the blow moulding process and throughout the entire life of the container.

At least the inner additional layer 10 is composed of said primary plastic material and a predetermined amount of colour additives.

Figure 6:
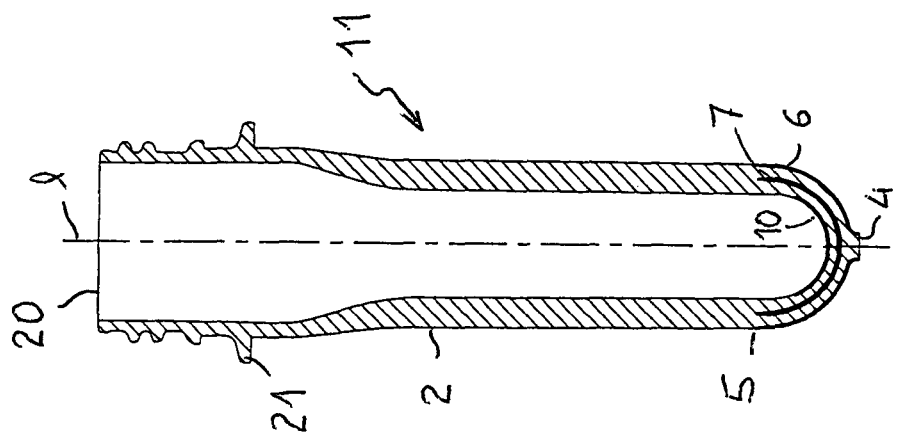
FIG. 6 is a mixed side view of a combined fourth, respectively fifth embodiment of the preform according to the invention.

In a further variant shown in FIG. 6, there is provided a multi-layer structure in the wall 2 itself of the preform 13 as well. Such a multilayer wall is essentially intended to provide a barrier layer 23. As shown in this FIG. 6, said barrier layer 23 is preferably formed by a natural continuation of said additional core layer 7, 8 or 9. The intermediate layer 23 is composed of a tertiary material intended to form the barrier layer. Oxygen that would migrate through the wall of the bottle can thus be withheld. Ingress of oxygen in a bottle should be avoided if it is intended to contain products that oxidize, break down, spoil or deteriorate in quality under the influence of oxygen. The barrier is also intended to prevent carbon dioxide from migrating from the inside through the wall of said bottle by stopping it. Likewise, the loss of carbon dioxide from the bottle must be avoided in the case of soft drinks or beer, for example. This barrier layer can be both an active or passive barrier: with a passive barrier, the tertiary material composing the barrier is impermeable or less permeable to certain substances such as $O_2$, $CO_2$, etc. . . . and prevent them from passing said barrier. With an active barrier on the contrary, the tertiary material reacts with a certain substance, thus keeping damaging and/or undesirable substances in the wall, which prevents them from either escaping or intruding.

The primary layer as well may contain additives with a neutralizing effect on unwanted gas, especially oxygen, originating from a degradation of the product contained in the container or other adverse reagents derived from the container or even vice versa.

In short, a barrier with PET or any other plastic layer containing additives may have the same function of oxygen or carbon dioxide, or even UV rays or light-migration stopper.

FIG. 6 shows in a left half representation a preform 31 with a double anti-drip moulding edge.

Said primary plastic material is preferably polyethylene terephthalate PET. The primary material can also be a plastic material to which additives are added. The primary material may also be composed of a mixture of recyclates and additives. In particular, primary plastic material additives are added to prevent the unwanted oxygen from outside to migrate inside the bottle so that it cannot reach the product in the bottle. This additive can also ensure that the oxygen which is present in the bottle together with the liquid, especially in the void contained on top of the filling level N of the drink, gets bound, so that it can neither cause oxidation. Another additive is a substance that binds acetaldehyde or AA. AA is a substance that appears in PET during the manufacturing of the preform in the injection-moulding device. When AA migrates from the wall of the bottle to the product in the bottle, it may cause a change of flavour, especially in carbonated water. Said additives may have either dying or scavenging function.

FIG. 11 shows a container 16 processed from said preform 11, especially by blowing it. The container 16 may also be produced directly, for example by injection in a specially provided mould.

FIG. 12 similarly shows a container 17, which is obtained from the preform 12.

Figure 13:
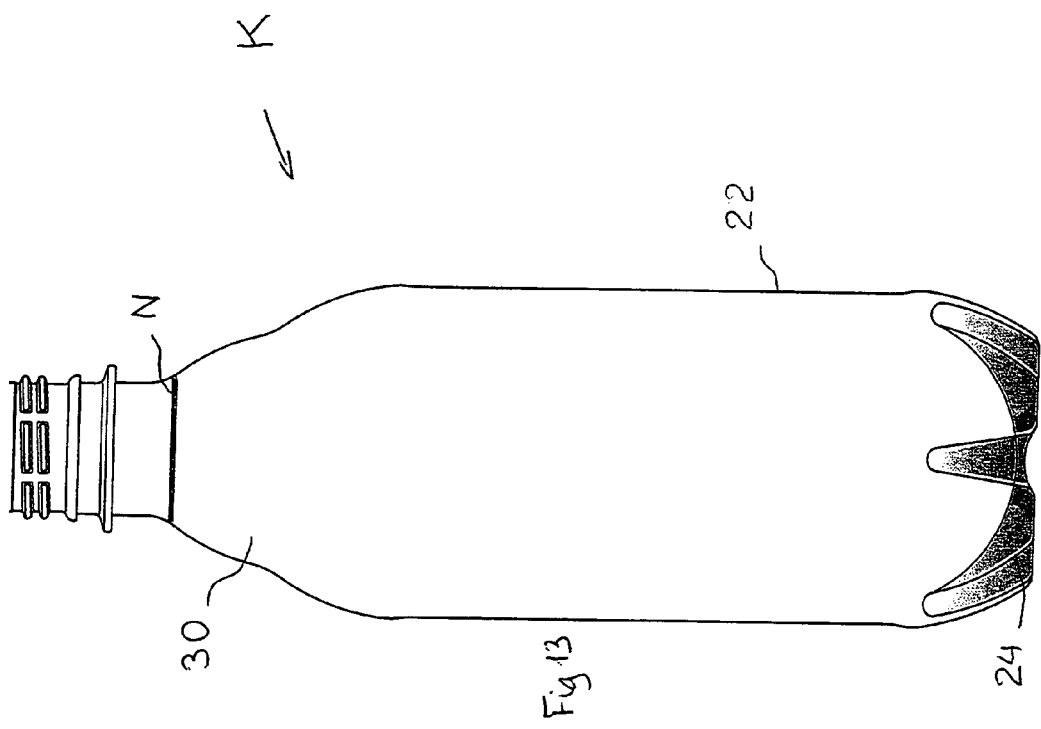

Said special colour effect obtained with the proposed container 16 is made visible in the functional representation of the container 16 shown in FIG. 13, in a filled state, especially with a liquid medium 30, particularly edible for drinking, which is preferably transparent, or at least semi-transparent, e.g. water or some alcoholic beverages.

Figure 14:
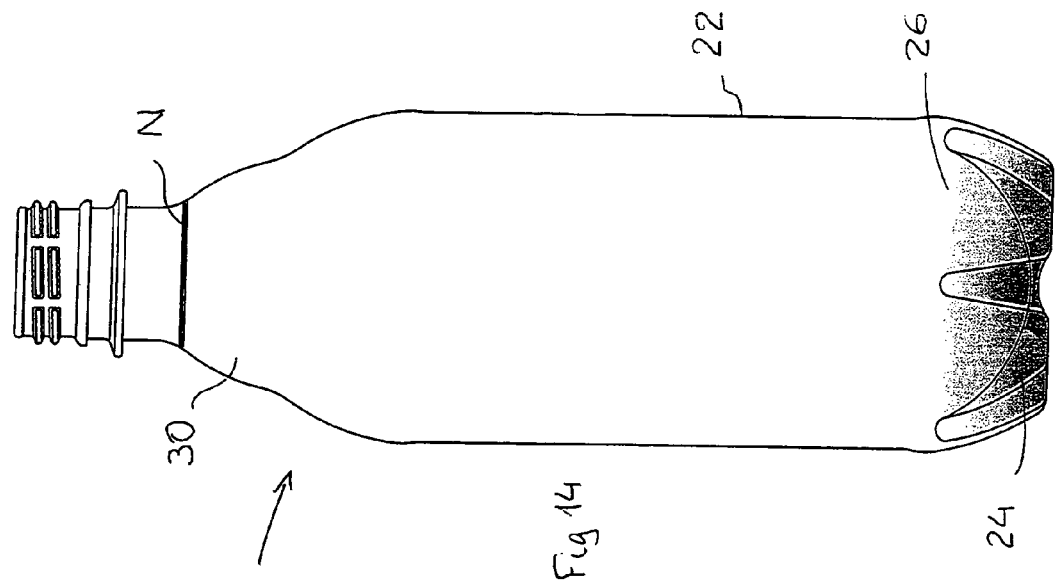
FIGS. 13 and 14 are a schematic representation of the functional operation of said first, respectively second embodiment of the container as represented in FIG. 11, resp. 12.

FIG. 14 shows a similar yet both reinforced and more nuanced colour effect 26 that is achieved with the variant of container 17 shown in FIG. 12.

Figure 16:
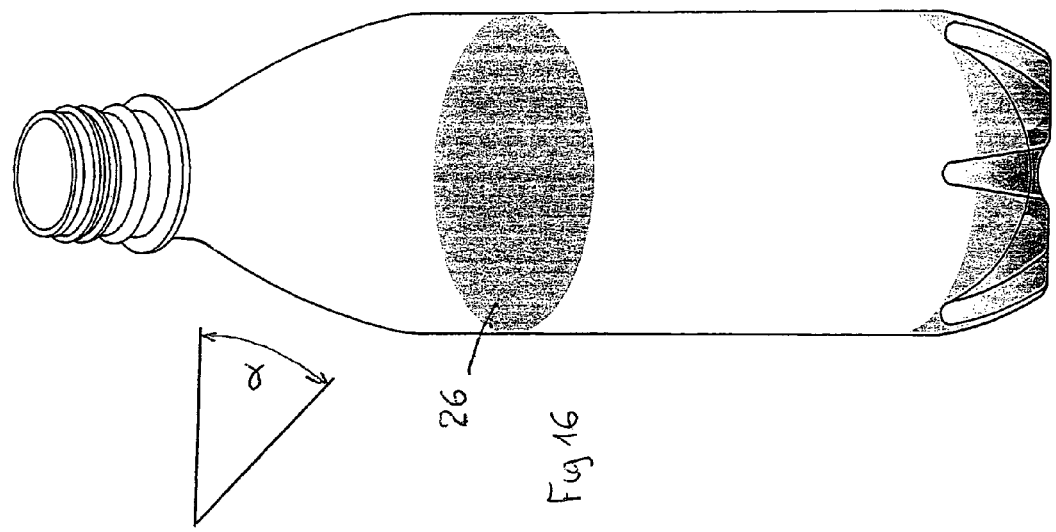
FIG. 16 is an analogous representation of said functional effect of said first embodiment of the preform according to the invention under a special observation angle.

Said colour effect 26 becomes more noticeably striking when the container is observed from a certain angle α as suggested in FIG. 16. The colour effect 26 is particularly pronounced from an observation angle α, yet at 20° and still more up to 45° measured from a horizontal reference plane perpendicular to the axis 1 of the container. The bigger the observation angle α to said extent, the stronger the aforementioned colour effect 26.

Said colour effect 26 can be observed mainly about the liquid level N, especially with containers having a virtually upright wall. Indeed, this colour effect is achieved through the mirror effect of the coloured bottom section 24 that is limited by said bending 5. The container wall 22 further behaves as a kind of wave-guide, wherein the coloration or colour appearance of the bottom 24 is transferred through said liquid medium 30 to the liquid level N. This remarkable colour shipment originating from a quite limited area of the container 16, 17, in particular the bottom 24 thereof, takes place when inserting an appropriate fluid 30 in the container, by its propagation function, when the liquid is transparent or at least translucent, especially with containers having an at least partially straight wall.

Figure 15:
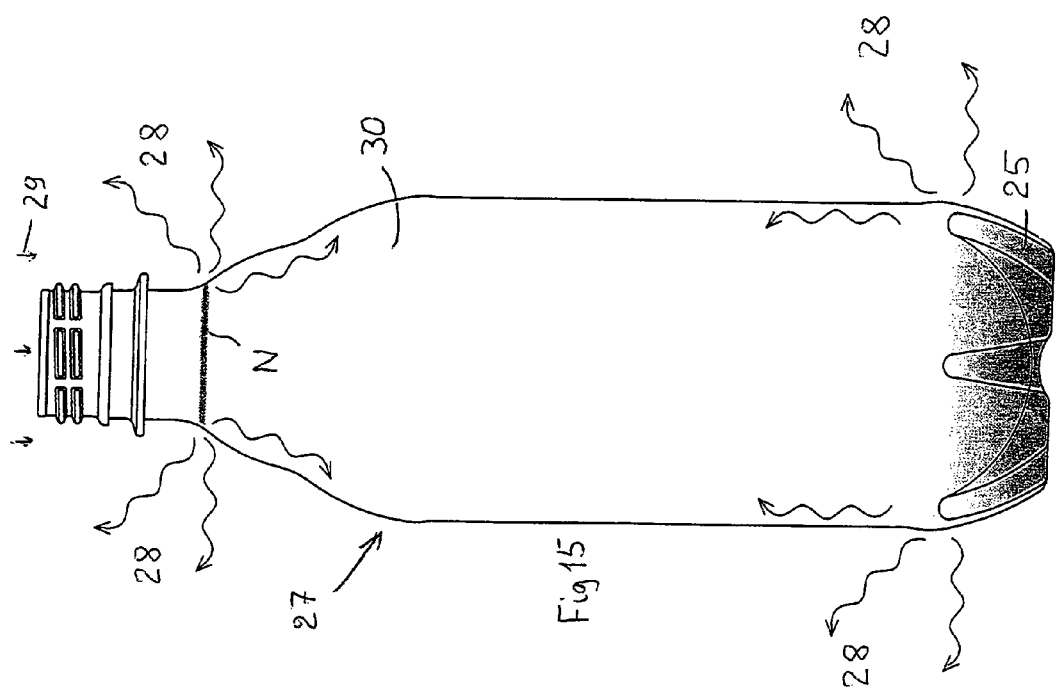
FIG. 15 is a specific symbolic dynamic representation of the second embodiment of a container shown in FIG. 12 according to the invention.

This remarkable colour effect 26 is particularly pronounced when a fluorescent dye material 25 is used. The overall colour effect 26 on a container 27 can then be made apparent in a very remarkable way by a subtle combination with ambient UV-light 29. This is represented in FIG. 15 by the various arrows symbolizing the emitted energy of said effect.

In a substantially equally remarkable manner, an analogous particular colour effect may be achieved by the incorporation of a phosphorescent dye material. A further alternative is the use of luminescent dye materials.

FIG. 17 shows a further embodiment of a container 18 with all the areas $A_2$, $B_2$, $Z_2$ substantially opaque, with the formation of a bi- or even tri-chromatic bottle 18, wherein a delimitated and definable transition area can be observed, with an additional colour from the transition strip $Z_2$.

FIG. 18 shows a still further embodiment of a container 18 which presents an analogy with the embodiment shown in the previous fig. but with all the areas $A_2$, $B_2$, $Z_2$ extending along the longitudinal axis 1 of the container or bottle, instead of perpendicular to it, which results in a wide variety ranging from horizontally extending fields to nearly vertical ones.

To summarize, the various embodiments set out above comprise a wide variety of possible combinations ranging from said at least partially transparent containers 16, 17, 27 with a local coloration $B_1$, $B_2$ which is essentially limited to the bottom 24, on the one hand, to generally opaque containers 18, which are coloured over their entire surface, on the other hand.

The former combination types are particularly remarkable by their special colour effects which are visible on their other parts A that are transparent but yet essentially uncoloured, precisely thanks to the transparency of the major part A of the same. Indeed, said special colour effects are achieved thanks to the transparency of a substantial part A of the bottle 16, 17, 27 that become particularly perceivable after filling K of the bottle. This enables achieving bottles including some colour at acceptable weight however, while keeping a good level of formality. Indeed, reducing substantially coloured areas allows significantly less pigments to be used, advantageously resulting in both cost and weight savings together with a formability remaining substantially unaffected. Since pigments or dyes are essentially located in the bottom area and mainly absent from the preform wall, the biaxially stretching thereof followed by the blow moulding to a bottle will not be affected by said pigments.

In the latter combination types of bottles 18, they are completely opaque and coloured on their whole extent, wherein some colour effects are rather generated directly by the bottle wall itself, in a more predictable way, than with the unexpected said former type.

Thanks to this utmost flexibility and freedom in the selection of areas A1, B1, respectively A2, B2, Z2 both in terms of colour and localisation, this type of polychromatic preforms, respectively containers, can be advantageously used as an outstanding information bearing medium for all kinds of purposes, such as identification means and similar, especially in marketing, thereby including a particularly attractive customization or even recognition. This in turn opens to a huge variety of quite useful applications such as in thereby including sorting methods based upon colour detection and separation methods for recycling purposes of waste bottles wherein bottles are separated by colour. A further advantage of the limited coloration to the bottom consists in the easier sorting of such bottles for recycling after use. E.g. U.S. Pat. No. 5,432,545 discloses a method for detecting the major colour of a bottle, despite the presence of labels. In case of bottles according to the present invention having coloration limited to the bottom section, said sorting will be made more easily, as the analysed image can be focused on the bottom section.

In addition, this selection flexibility is even more enhanced by the variability of the height parameter in connection with the actual distance of the separation line $Z_1$ to the bottom of the preform, which offers the advantage to be adjustable in height respective the bottom.

The invention claimed is:

1. Preform for the blow moulding of a container comprising a pouring opening, a neck section, an adjacent wall section and a bottom section opposite to the neck section as supporting base of the produced container, wherein the adjacent wall section of the preform is composed of a primary area, and wherein the bottom section forms at least one secondary area, wherein said primary area comprises a primary plastic material, said at least one secondary area having at least one secondary material, said primary and secondary areas having a mutually different coloration, wherein at least a part of said bottom section is composed of a multi-layer structure having primary layers composed of said primary plastic material which is colored, and secondary layers composed of the said at least one secondary material, which is colored differently than the primary layers, wherein the bottom section multi-layer structure has two surface layers, one of the two surface layers is directed outwardly respective the preform, whereas the other one of the surface layers is directed inwardly, with the secondary layers located in between, thereby constituting core layers, which are located between two said primary layers, and in that said preform consists in one single piece, thereby producing special color effects in the container and contents of the container blow molded from the preform.

2. Preform according to claim 1, wherein at least one of the areas is opaque and/or translucent, wherein it is coloured, and/or wherein said secondary area is opaque and/or translucent and said secondary area is limited to the bottom section of the preform, and/or wherein at least said primary area is transparent and/or not coloured.

3. Preform according to claim 1, wherein the transition between said areas of the preform further comprises a separation line, or wherein said areas are separated by a transition zone with a weaker contrast when compared to the one between the primary and secondary areas.

4. Preform according to claim 1, wherein at least one of said additional secondary layers is composed of a mixture of plastic as said at least one secondary material with a colour dye.

5. Preform according to claim 1, wherein at least one secondary material is the same as said primary plastic material, and/or wherein said core layer has a thickness up to half of the bottom thickness.

6. Preform according to claim 1, wherein said core layer extends from the bottom up to at least the same extent as said inner layer or outer layer, or wherein said core layer extends from the bottom to a height above said inner layer or outer layer.

7. Preform according to claim 1, wherein at least one of said materials comprises additives, which have a neutralizing action on reagents with an adverse effect on the product to be contained in the container, wherein an active or passive barrier is formed in the wall of the preform.

8. Preform according to claim 1, wherein the preform is a container intended for containing products therein that are sensitive to radiation and light sensitive food and dairy products, wherein said preform is opaque over a whole extent thereof, wherein plastic additives is incorporated to generate said opaque appearance, so as to protect the inner space thereof which is delimitated by it against external radiation.

9. Preform according to claim 1, further comprising an intermediate layer between the primary layers, and wherein at least one of the intermediate layers comprises a fluid or a liquid.

10. A preform according to claim 1, blown by blow moulding into a container wherein the container has a coloration density, which is such that the container is transformed from opaque to transparent and/or wherein the container presents polychroism at least locally.

11. A preform blown into the container according to claim 10, wherein the container is filled with a light scattering medium.

12. A preform blown into the container according to claim 11, wherein said container is placed in artificial light.

13. Preform according to claim 9, wherein at least one of said fluid or liquid is composed of polymer bio-aggregate which is composed of cells and/or cell products which are worked in a polymer.

14. Preform according to claim 3, wherein said transition zone has a width that is substantially constant.

15. Preform according to claim 3, wherein said separation line or transition zone extends perpendicularly to a longitudinal axis of the perform.

16. Preform according to claim 3, wherein the colouring within each of said first and second areas is substantially uniform.

17. Preform according to claim 1, wherein the transition from said primary area to said secondary area is seamless.

18. Preform for the blow moulding of a container comprising a pouring opening, a neck section, an adjacent wall section, and a bottom section opposite to the neck section as supporting base of the produced container, wherein the preform is composed of a primary area, and at least one secondary area, wherein said primary area consists of a primary plastic material, said at least one secondary area consisting of at least one secondary material, wherein said primary and secondary areas have a mutually different coloration, wherein at least a part of said bottom section is composed of a multi-layer structure having primary layers composed of said primary plastic material, and additional secondary layers composed of the said at least one secondary material, which include two surface layers the one of which is directed outwardly respective the preform, whereas the other one is directed inwardly, with an intermediate secondary layer located in between, thereby constituting a core layer, which is further located between two said primary layers, and wherein said preform consists in one single piece, the transition from said primary to said secondary area or areas being seamless, and wherein the primary material constitutes the complete volume of the wall and neck section.

19. Method for injection moulding the preform of claim 1, the method comprising: forming on said preform a neck section including a pouring opening, an adjacent wall section and a bottom section opposite to the neck section with which to form a supporting base of the container, wherein the moulding comprises the following steps:
  b) first injecting the secondary material, which solidifies on the cold surfaces of a mould in an outer layer and of a core in an inner layer in the bottom section of said preform;
  c) then injecting the primary material, which flows to the wall section and the neck section constituting substantially the complete volume of said wall and neck sections and two layers in the bottom section, in contact with the secondary material already solidified and
  d) finally injecting the secondary material, filling up the remaining volume in the bottom section, constituting a core layer in said bottom section.

20. A method comprising forming a preform for blow moulding of a container, further comprising forming a pouring opening, a neck section, an adjacent wall section and a bottom section opposite to the neck section as supporting base of the container, forming the adjacent wall section of the preform with a primary area, and forming the bottom section with at least one secondary area, said primary area having a primary plastic material, and the at least one secondary area having at least one secondary material, the primary and secondary areas having a mutually different coloration, wherein at least a part of said bottom section is formed of a multi-layer structure having primary layers composed of said primary plastic material which is colored, and secondary layers composed of the said at least one secondary material, which is colored differently than the primary layers, wherein the bottom section multi-layer structure has two surface layers, one of the two surface layers is directed outwardly respective the preform, whereas the other one of the surface layers is directed inwardly, with the secondary layers located in between, thereby constituting core layers, which are located between two said primary layers, and in that said preform consists in one single piece, thereby producing special color effects in the container and contents of the container blow molded from the preform.

21. Method according to claim 20, further comprising forming a tertiary material before a final stage of forming the secondary material, so that said tertiary material constitutes an intermediate layer in said wall section.

22. Method according to claim 21, wherein a predetermined quantity of the primary material is injected in a hollow mould space, and a predetermined quantity of the secondary or tertiary material is injected in the injected primary material in said hollow mould space before formation of a core, wherein the secondary or tertiary material is incorporated which is different from said primary material, wherein the injection in said hollow mould space is a parallel injection together with a part of said primary material, in that when injecting in parallel in the region of the injection aperture of said hollow mould space, said secondary or tertiary material is injected outwardly from said preform and said primary material is injected inwardly with respect hereto.

23. Method according to claim 22, wherein at least one of said materials injected incorporates living material and is produced by a method comprising the following steps:
  a) a polymer is selected;
  b) a set of organisms is selected from among cells, living organisms and/or cell products and
  c) aggregates are formed by working said cells, living organisms and/or cell products in said polymer resulting in the formation of a polymer-bio aggregate,
  wherein work is carried out at the working temperature range taken from a selected temperature interval, the lower limit whereof may be set at substantially 100° C. under standard pressure conditions, at one atmosphere.

24. Method according to claim 20, wherein the primary material comprises PET as the primary material.

25. Method according to claim 20, wherein a quantity of the primary material is slightly reduced and a quantity of the secondary material formed in the final step is increased, so that the secondary material layer extends further in the wall section.

26. Method according to claim 20, wherein prior to the forming, a predetermined amount of additives is added to one of the primary and secondary materials, thereby providing a neutralizing effect on undesirable influences.

* * * * *